United States Patent [19]
Bondyopadhayay

[11] Patent Number: 5,886,667
[45] Date of Patent: Mar. 23, 1999

[54] INTEGRATED MICROSTRIP HELMET ANTENNA SYSTEM

[76] Inventor: Probir K. Bondyopadhayay, 14418 Oak Chase Dr., Houston, Tex. 77062

[21] Appl. No.: 926,836

[22] Filed: Sep. 10, 1997

Related U.S. Application Data

[60] Provisional application No. 60/027,177, Oct. 1, 1996.

[51] Int. Cl.$^6$ .................. H01Q 1/38; H01Q 1/12
[52] U.S. Cl. .................. 343/700 MS; 343/718
[58] Field of Search .............. 343/700 MS, 718, 343/853; H01Q 1/38, 1/12

[56] References Cited

U.S. PATENT DOCUMENTS

| | | | |
|---|---|---|---|
| 3,582,951 | 6/1971 | Altmayer | 343/718 |
| 3,977,003 | 8/1976 | Kershaw | 343/718 |
| 5,231,406 | 7/1993 | Sreenivas | 343/700 MS |
| 5,376,942 | 12/1994 | Shiga | 343/700 MS |
| 5,438,702 | 8/1995 | Jackson | 455/89 |
| 5,554,995 | 9/1996 | Jun | 343/700 MS |

*Primary Examiner*—Don Wong
*Assistant Examiner*—Tan Ho
*Attorney, Agent, or Firm*—Marvin J. Marnock

[57] ABSTRACT

An integrated helmet and omnidirectional microstrip antenna system comprising a ballistic helmet constructed of rigid non-metallic material with a sheet of dielectric material as the top layer thereof and an omnidirectional microstrip antenna system having one or more antenna radiator elements affixed to the top surface of the dielectric sheet. The antenna radiator elements are circularly polarized by a microstrip feed network designed to provide circular polarization of a desired sense. A conductive layer of metallic material bonded to the underside of said dielectric sheet and integrated in the helmet structure serves as the electrical ground for the antenna.

21 Claims, 9 Drawing Sheets

INTEGRATED MICROSTRIP HELMET ANTENNA SYSTEM

This application is based on Provisional Application, Ser. No. 60/027,177 filed Oct. 1, 1996.

FIELD OF INVENTION

This invention relates generally to microstrip antennas for omnidirectional or wide angle transmission and reception and more particularly to a microstrip patch antenna system integrated with a soldier's helmet to enable secure and reliable communications between the soldier and a command center and for receiving Global Positioning System (GPS) signals.

BACKGROUND OF THE INVENTION

In battlefield communications there is a clear and important need to have individual soldiers in combat in constant, reliable and secure wireless communication with the field command center. Realization of such communication systems requires that an omnidirectional antenna system be conveniently located and accessible to the soldier at all times, particularly when in a rapidly mobile environment. There is also a need for a system capable of receiving the Global Positioning System (GPS) signal whereby the soldier is able to determine his precise location.

Although a pocket sized VHF radio transceiver could satisfy many of the communication requirements, the need for secure communication, and transmission of video data and high data rate communications requires a system which operates with larger bandwidth. Furthermore, for unobstructed communication for all physical positions of the soldier in the battle field it is a virtual necessity that the antenna be so placed on the person of the soldier that the antenna receives continuous coverage from the operating transmitter.

While omnidirectional or wide angle coverage can be provided by monopole rod antennas, helical antennas, and quadrafiller helix or conical helix antennas, such antennas, which are not conformed to the surface of the supporting structure on which the antenna resides, are easily identifiable and are more likely to be damaged or rendered inoperative.

Rapid advances in microwave, integrated circuit technology, communication technology, display technology and several other related areas have made it possible to provide sophisticated communication capabilities to the individual soldiers in combat in the battlefields and elsewhere. Heretofore, however, omnidirectional microstrip antenna systems have not been devised for incorporation and mounting on a helmet such as a soldier's helmet, nor for application to any spherical or near spherical surface. Helmet antennas which do not involve microstrip patch antenna elements are described in U.S. Pat. Nos. 3,582,951; 3,977,003; and 5,438,702.

Also, in U.S. Pat. No. 4,527,163 there is described an omnidirectional microstrip antenna system on a vertical cylindrical surface which is designed to broadcast 360° in azimuth and a certain angular sector in elevation for satisfying a specific system performance requirement. In U.S. Pat. No. 4,922,259 there is described a microstrip antenna system placed inside the nose cone of an airplane that is required when in flight to maintain constant communication with a ground station. However, other than the fact that these two patents deal with microstrip antennas for providing omnidirectional or wide-angle coverages, they are not directly related to the integration of a microstrip antenna system in a soldier's helmet as does the present invention.

SUMMARY OF THE INVENTION

The present invention is an omnidirectional microstrip antenna system for use by an individual soldier in battlefield communications. The antenna system comprises one or more microstrip patch elements integrally incorporated in a soldier's helmet made of non-metallic material and having a generally convex configuration with an external surface of spherical or approximately spherical curvature. In one form of the invention, the body of the helmet may be used as the substrate for the microstrip antenna system integrated therewith. Each antenna element in the system is a microstrip patch affixed to the top surface of the helmet and circularly polarized by a feed network provided by microstrip feed lines which may be located in the same surface layer as the antenna elements or in a layer directly below. An electrically conductive layer of metallic material integrated in the helmet structure below the antenna radiator elements and separated therefrom by at least one dielectric layer serves as the electrical ground for the antenna. The conductive ground layer may be a solid metallic sheet or a conducting screen of appropriate mesh size which is buried in the helmet structure at a depth predetermined by the specific antenna design and its operating frequency. The microstrip antenna elements located in strategic places on the helmet provide omnidirectional coverage and reliable communication for almost all positions of the helmet on the soldier's head. In one embodiment of the invention, there is one antenna element located at the center top of the helmet and surrounded by a ring of several antenna elements, each located at a predetermined direction angle and distance off the top element so as to provide practically omnidirectional coverage with acceptable antenna gain variation profile.

In another embodiment, consecutive microstrip elements in the above-mentioned ring arrangement are staggered in their relative positions with respect to their distances from the top of the helmet as necessitated by the design optimization process to take into account the non-spherical nature of the helmet surface.

This integrated microstrip antenna system could also be readily adapted for use in Global Positioning System signal reception for which application, one antenna element conformably and integrally positioned at the top of the helmet will sometimes suffice.

DETAILED DESCRIPTION OF THE INVENTION

Figure 1:
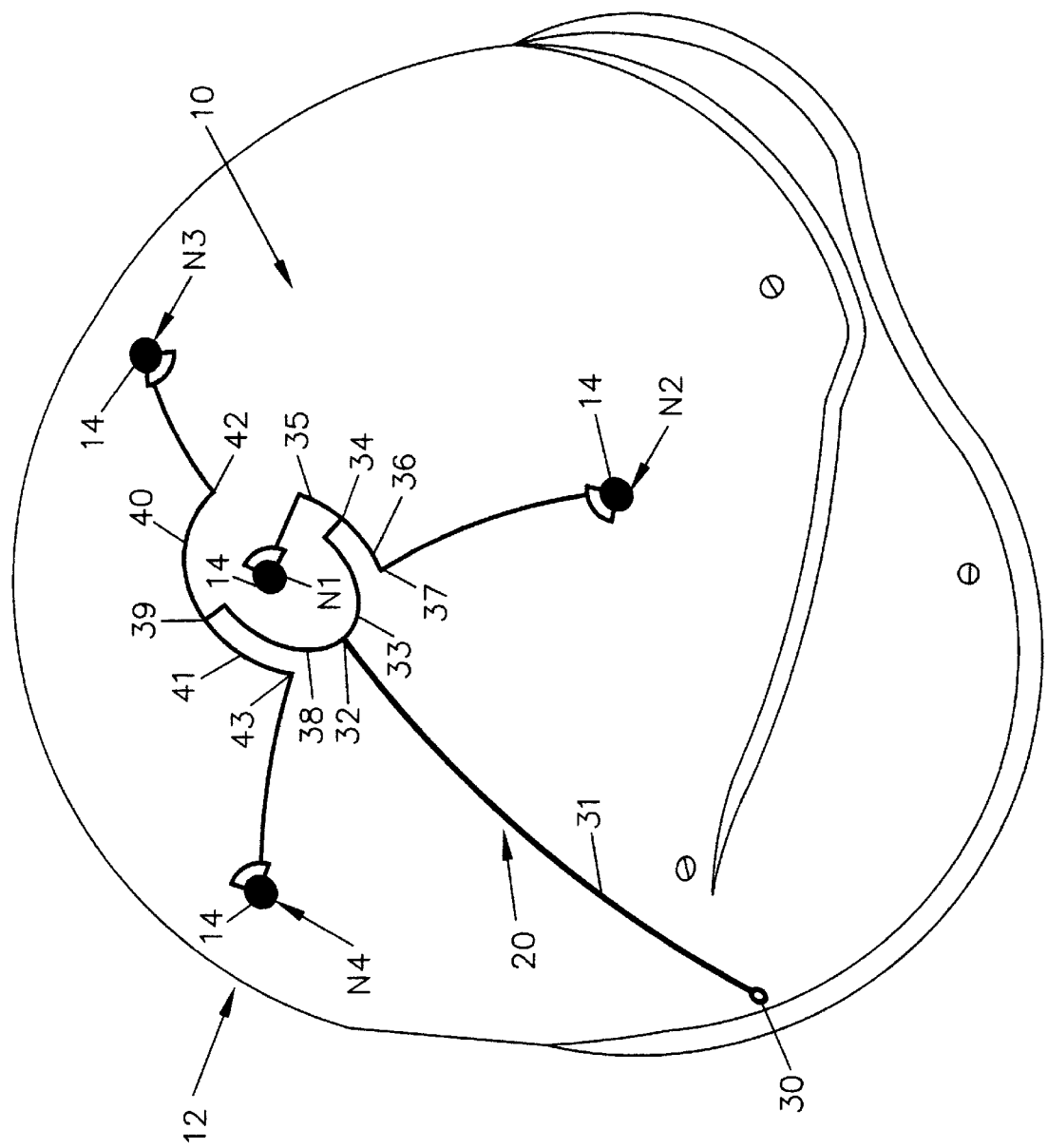
FIG. 1 is a perspective view of a soldier's helmet with a microstrip antenna system integrated with a soldier's helmet in accordance with the invention.

Referring more particularly to the drawings there is shown in FIG. 1 an omnidirectional microstrip antenna system 10 mounted on a soldier's helmet 12 in integral relationship therewith.

Figure 2:
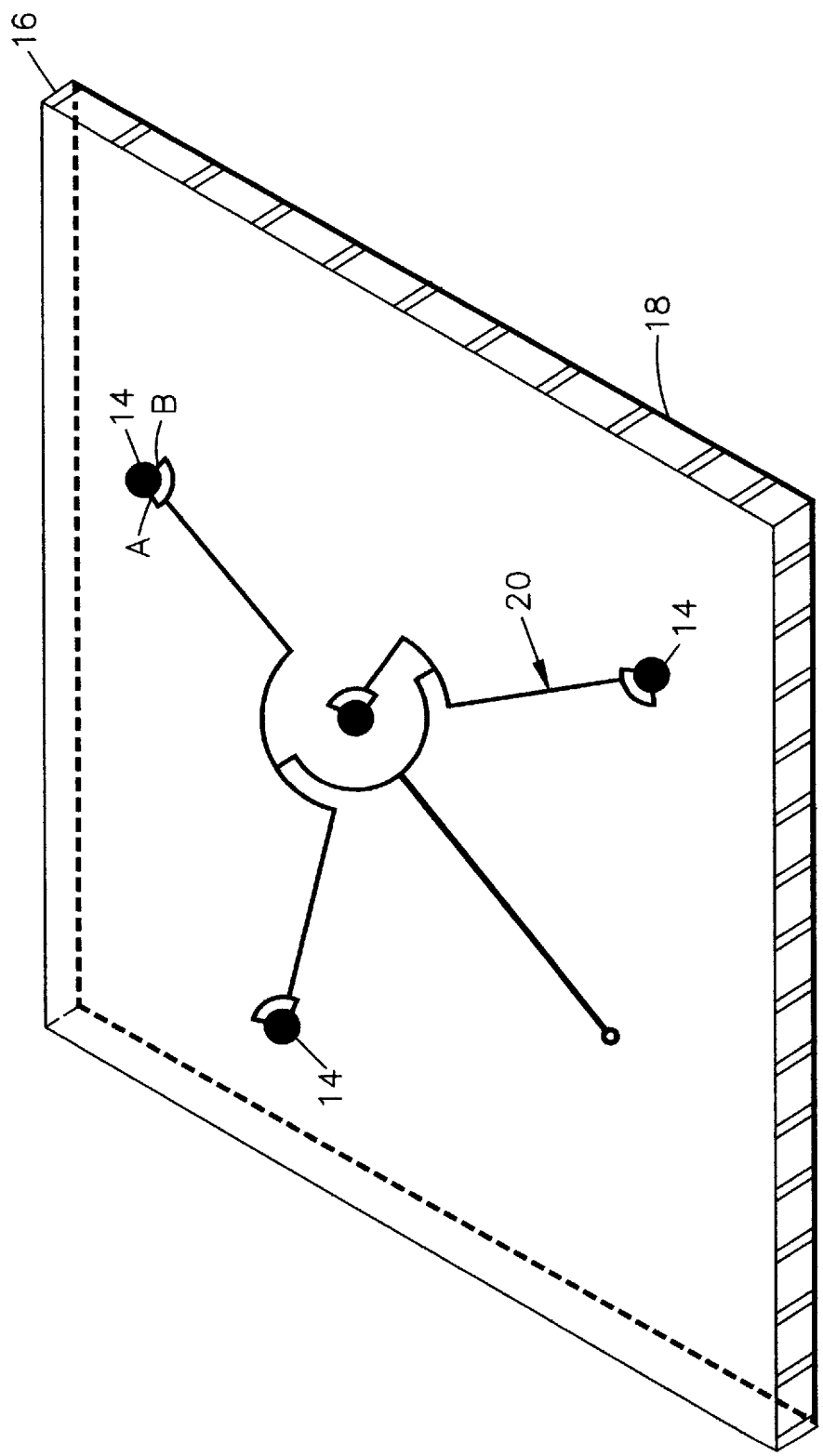
FIG. 2 is a perspective view showing a planar layout of a four element printed array of microstrip antenna elements on a dielectric substrate which is incorporated in a helmet in accordance with the invention.

The omnidirectional integrated microstrip antenna system 10 comprises a printed antenna including four microstrip radiator elements 14 which in the construction process is first mounted, as shown in FIG. 2, in a planar arrangement on the surface of a dielectric substrate 16. The surface of the substrate opposite to the printed antenna structure is clad with a thin conducting layer 18 of conductive material such as copper or aluminum. This antenna structure illustrated in the planar layout becomes an integral part of the helmet top surface by subsequent shaping of the structure from its planar configuration to conform to the top surface of a helmet in a manner to be hereinafter described.

Figure 3:
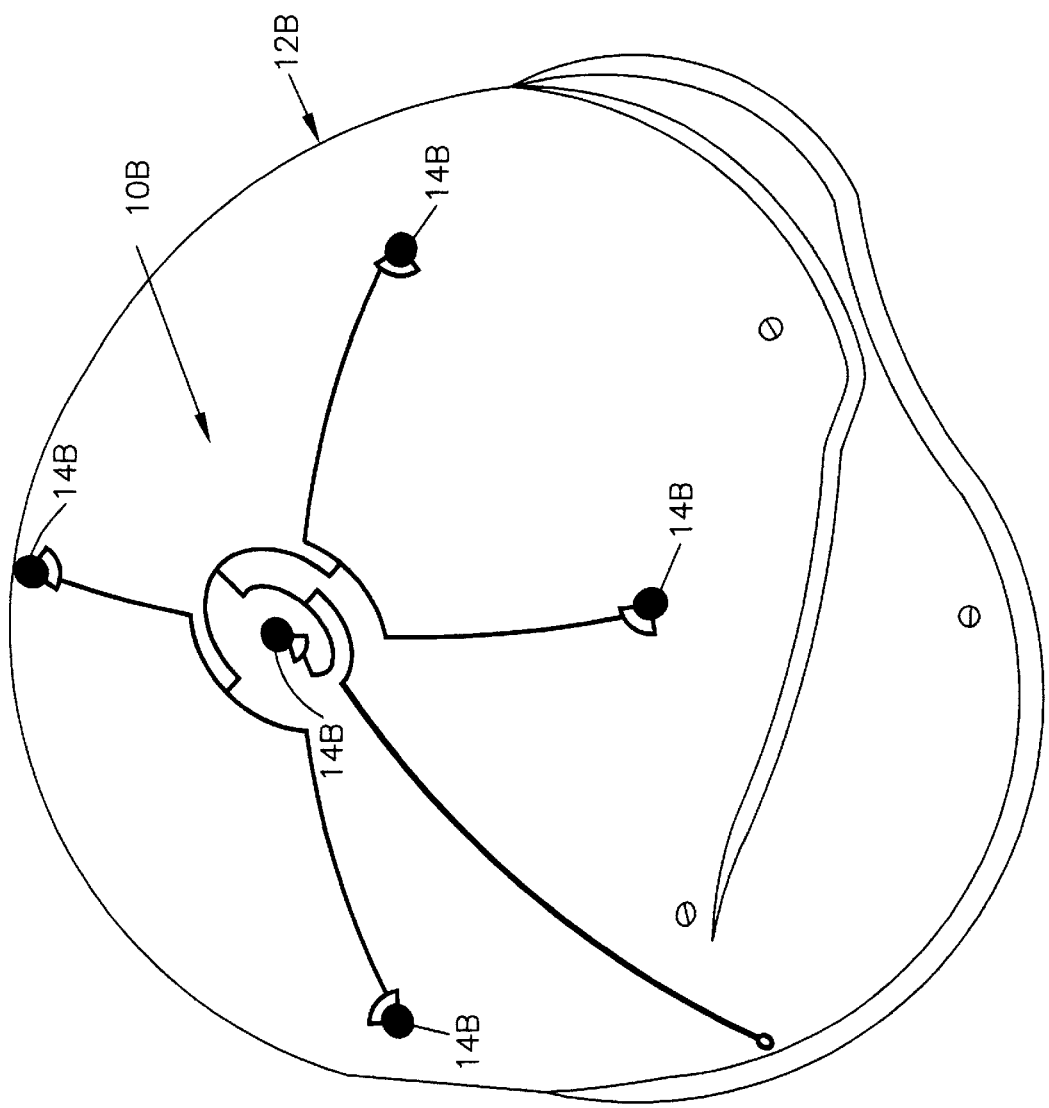
FIG. 3 is a perspective view of a soldier's helmet with a five element microstrip antenna system integrated in a soldier's helmet in accordance with the invention.
Figure 4:
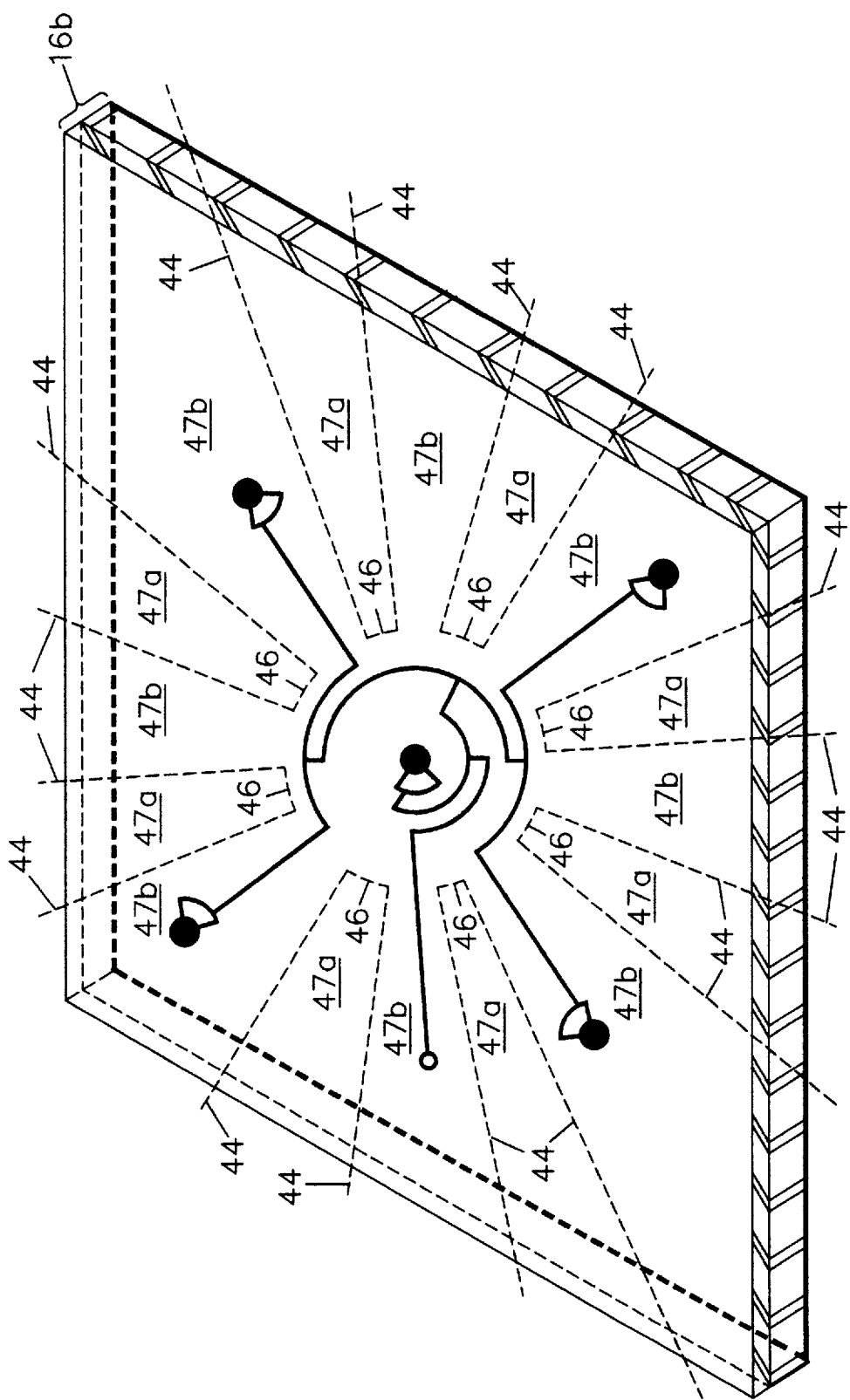
FIG. 4 is a perspective view of a planar layout of the five element printed array of microstrip antenna elements of FIG. 3 shown mounted on a dielectric laminar substrate.

In FIG. 3, an omnidirectional microstrip antenna system 10B is shown integrated with a soldier's helmet 12B in accordance with the invention. The planar layout of the antenna system 10B is shown in FIG. 4.

It is to be appreciated that the soldier's helmet shown in FIG. 1 and FIG. 3, or for that matter most any other ballistic helmet, approximately follows the shape and contour of a person's head and therefore is not exactly spherical in shape. Accordingly, for the successful design of the omnidirectional helmet antenna of the present invention, it is usually necessary to construct a simplified structural model that can be easily analyzed to determine where on the helmet exterior surface the individual microstrip patch radiators have to be placed and in what amplitude and phase relationships so as to realize the omnidirectional feature of the antenna system.

Strictly speaking, an omnidirectional antenna means the antenna can provide communication coverage of −90° to +90° in elevation and 0° to 360° in azimuth. However, in the context of the helmet antenna, the elevation coverage of approximately −30° to +90° in elevation will suffice to meet the practical definition of omnidirectional coverage.

Figure 6:
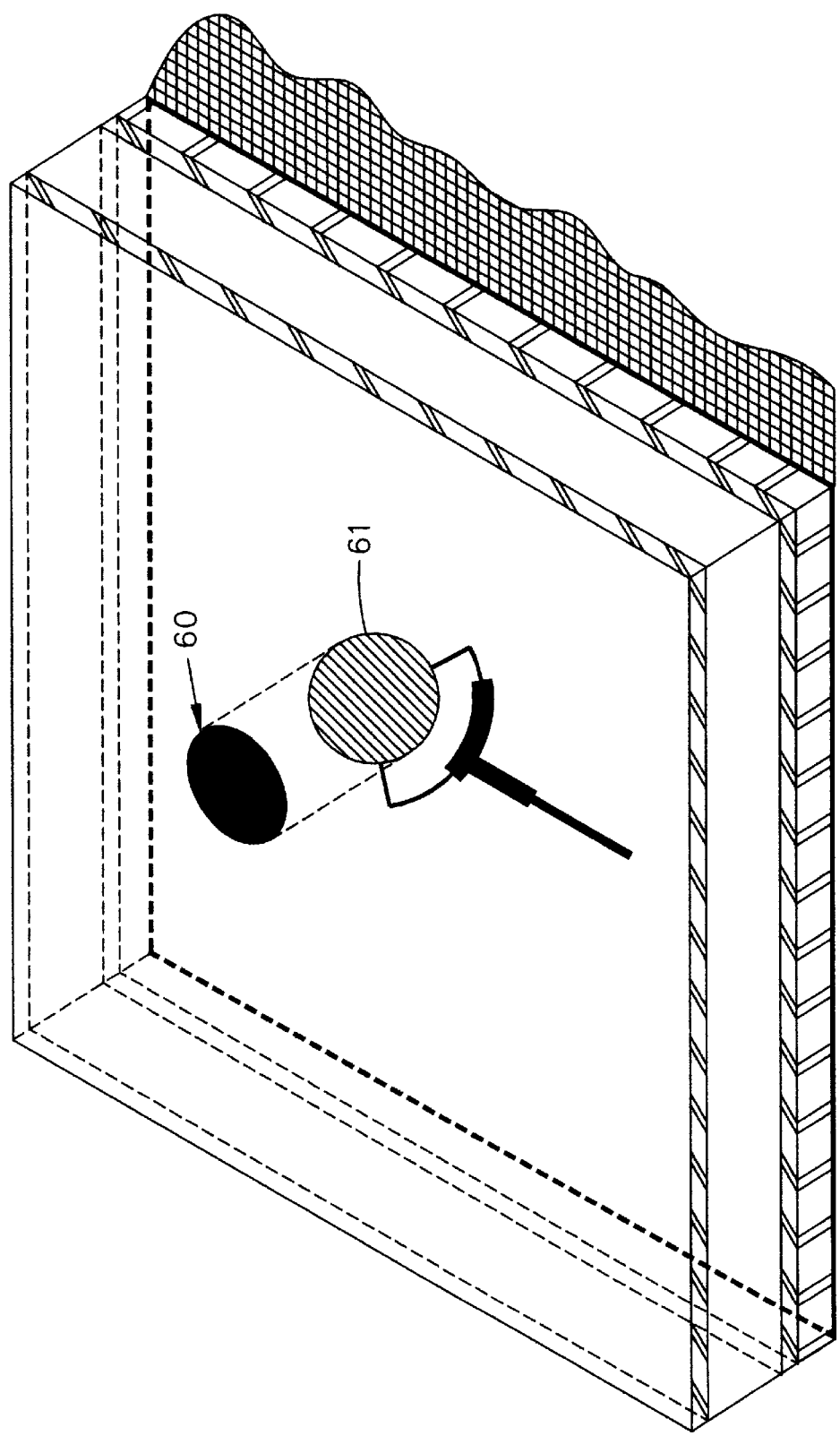
FIG. 6 shows an electromagnetically coupled antenna element excited from below by a microstrip line fed dual feed circular microstrip patch element, and which could be employed in the antenna element arrays of the invention to improve impedance bandwidth.
Figure 7:
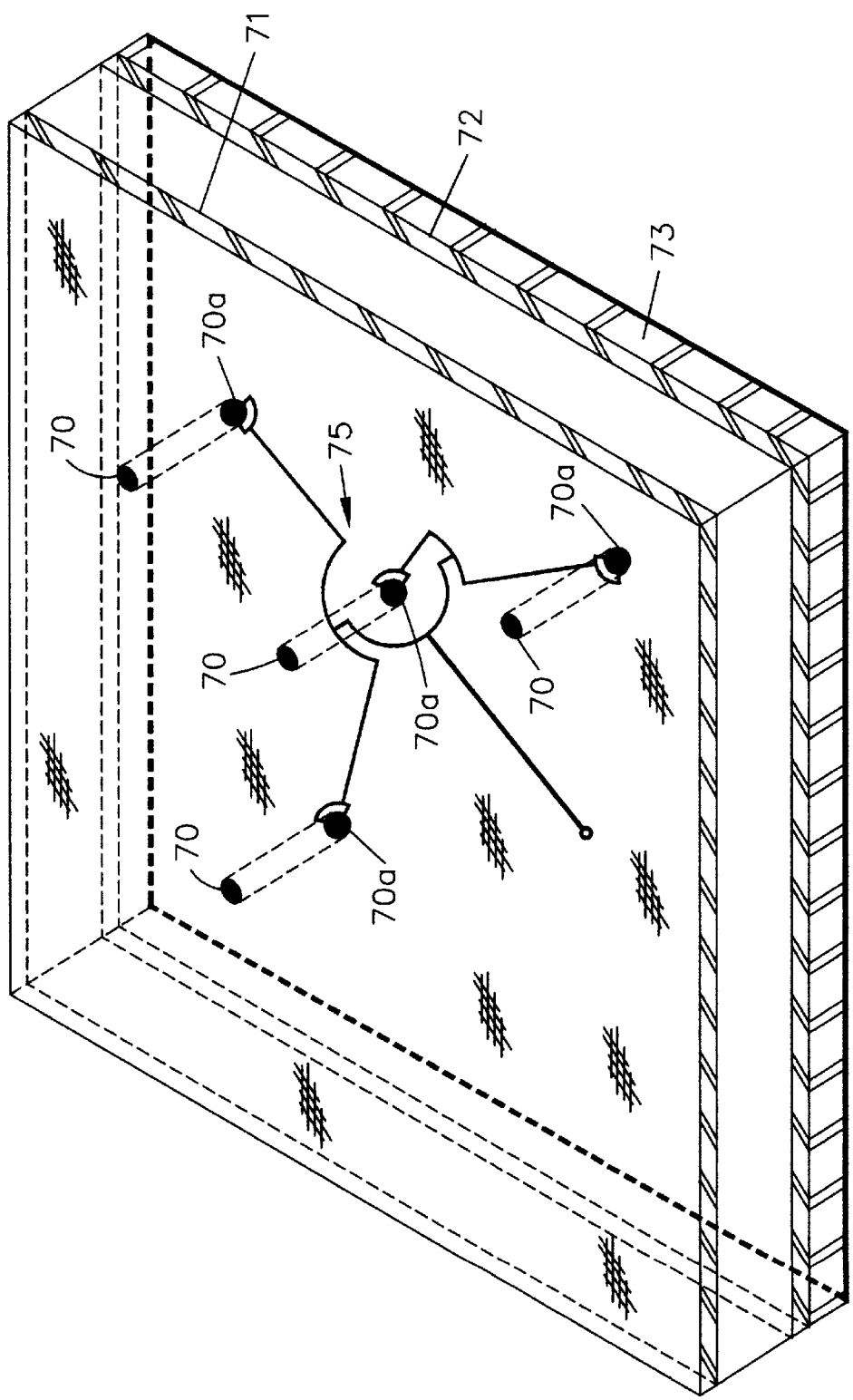
FIG. 7 shows an electromagnetically coupled antenna element array for providing wider bandwidth performance wherein the top circular microstrip patch antenna element is excited by a corresponding bottom element which is a dual feed circular microstrip patch element of an array fed by a microstrip feed line structure and which is integratable with a helmet in accordance with the invention.

The omnidirectional antenna system 10 consists of an array of radiating elements 14 and their associated feed network 20. The feed network 20 is generally made of microstrip lines laid out in the same structural layer as the radiating elements 14 and is conducively connected to the microstrip antenna radiator elements. The antenna system comprising the radiating elements and feed network are typically etched from a thin metal sheet, e.g. copper of 0.003 in. to 0.01 in. thickness, which is bonded firmly over the top surface of the helmet structure during the helmet manufacturing process. It is to be appreciated, however, that in other embodiments of the invention the feed structure could be located in an inside lower structural layer separated by the dielectrics from the antenna radiating elements top layer, such as shown in FIGS. 6 and 7, to be later described.

It is also to be appreciated that the performance requirements of the communications system dictate the design for the particular microstrip antenna characteristics and the conventional circularly polarized microstrip antenna is usually comprised of an array of microstrip antenna elements when the required gain in a certain direction is higher than that provided by a single radiating element. In such an antenna design, the feed line structure imposes the appropriate amplitude and phase relationships amongst the antenna elements such that the antenna structure functions as an omnidirectional antenna with the required performance characteristics. For omnidirectional function, each antenna element is made capable of supporting circular polarization of the desired sense with the required bandwidth of operation.

In the preferred embodiment of the present invention, the antenna element 14 is a circular conducting microstrip patch. Referring to FIGS. 1 through 4, it is shown that each circular microstrip patch element 14 is excited with dual point feed at feed points A and B by microstrip lines (31–43) for feeding the element in simultaneous space and phase quadrature so as to excite the desired sense of circular polarization. In the configurations in FIGS. 1 through 4, the feed structure, which is made of microstrip lines, lies in the same surface layer as the antenna elements and the two feed points A and B for each element lie on the circular edge of the patch. As is known to those skilled in the art, such feed structure will require impedance matching because the feed line characteristic impedance may not be equal to the radiation impedance presented by the circular microstrip element at the edge feed point.

Figure 9:
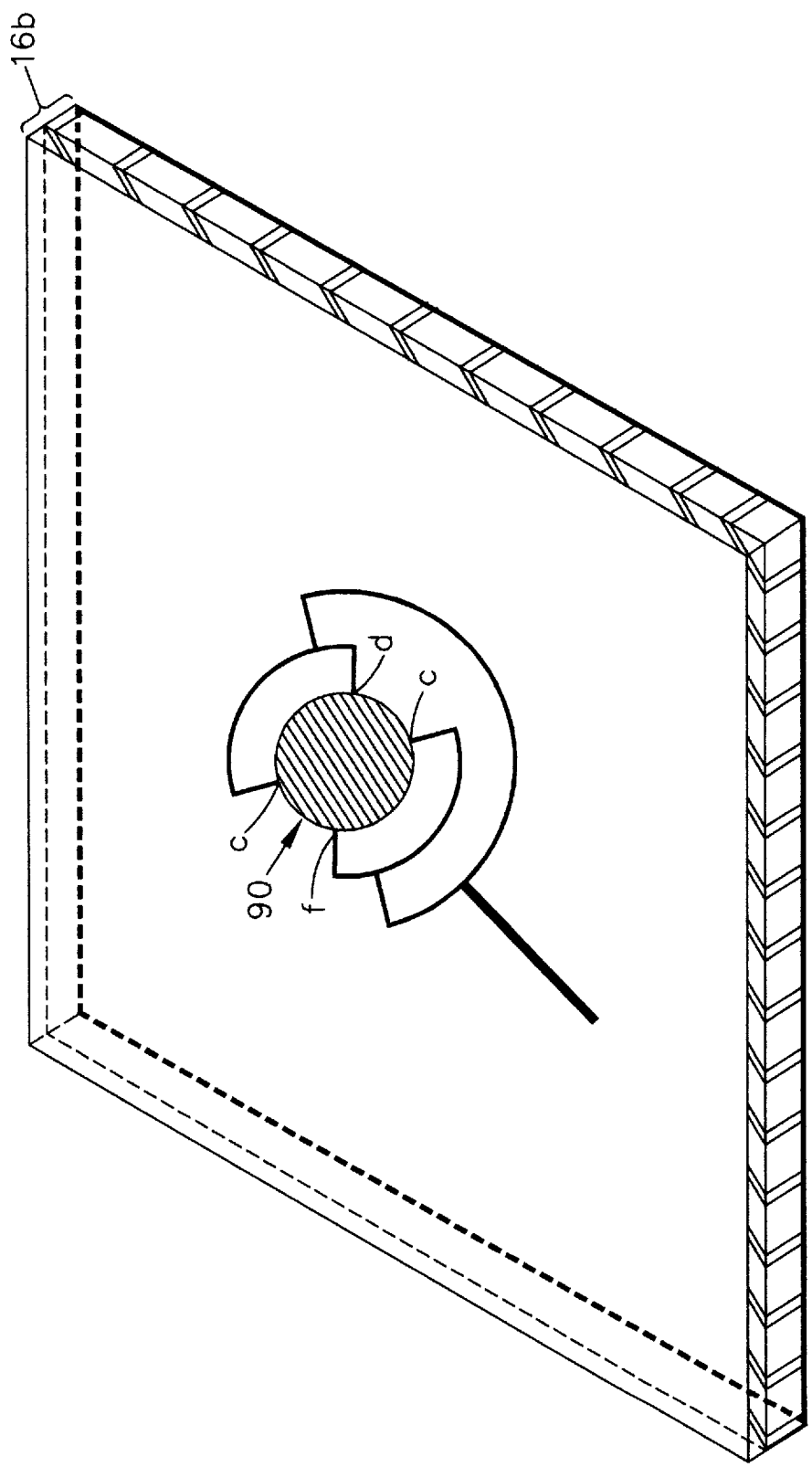
FIG. 9 shows a quadruple feed right circularly polarized circular microstrip patch antenna element for transmission which can be utilized as the antenna element in the microstrip antenna system of the invention to provide for better bandwidths of operation.

The antenna system 10 with antenna radiating elements 14 and their associated microstrip feed structure 20 is incorporated in a typical soldier's helmet which is made of plies of an aramid or aromatic polyamide woven material such as KEVLAR, a commercially available product. A method for making such a helmet, as described in U.S. Pat. No. 4,778,638, comprises forming plies of the material in blanks which are formed by cutting a sheet along radial lines and arcuate lines as shown by dashed lines 44 and 46 in FIG. 4 and removing alternate sections 47a to form flaps 47b which are then laid in a mold cavity and pressurized therein to form the helmet body. For making the integrated antenna system and helmet of the present invention, a dielectric layer or sheet of unwoven aramid material, such as THERMOUNT, a commercially available product, is bonded onto the top layer of a conventional soldier's helmet, or included in the original manufacturing of the helmet in a process as described above. The dielectric THERMOUNT material is of a selected predetermined thickness and, in the antenna systems shown in FIG. 2 and FIG. 4, is provided on its underside with a thin conducting layer 18, preferably of copper or aluminum, which serves as the conducting ground layer of the antenna. Typically, two or more layers of THERMOUNT laminates, available in various thicknesses of 0.003 inch to 0.02 inches as shown by the substrate 16b in FIGS. 4 and 9, are bonded together by thermochemical means, such as an epoxy resin, in order to achieve the desired thickness and provide the final top layer which serves as the substrate for building the antenna system thereon. For an operating frequency grater than 10 gigahertz, a single layer of THERMOUNT is sufficient.

Figure 5:
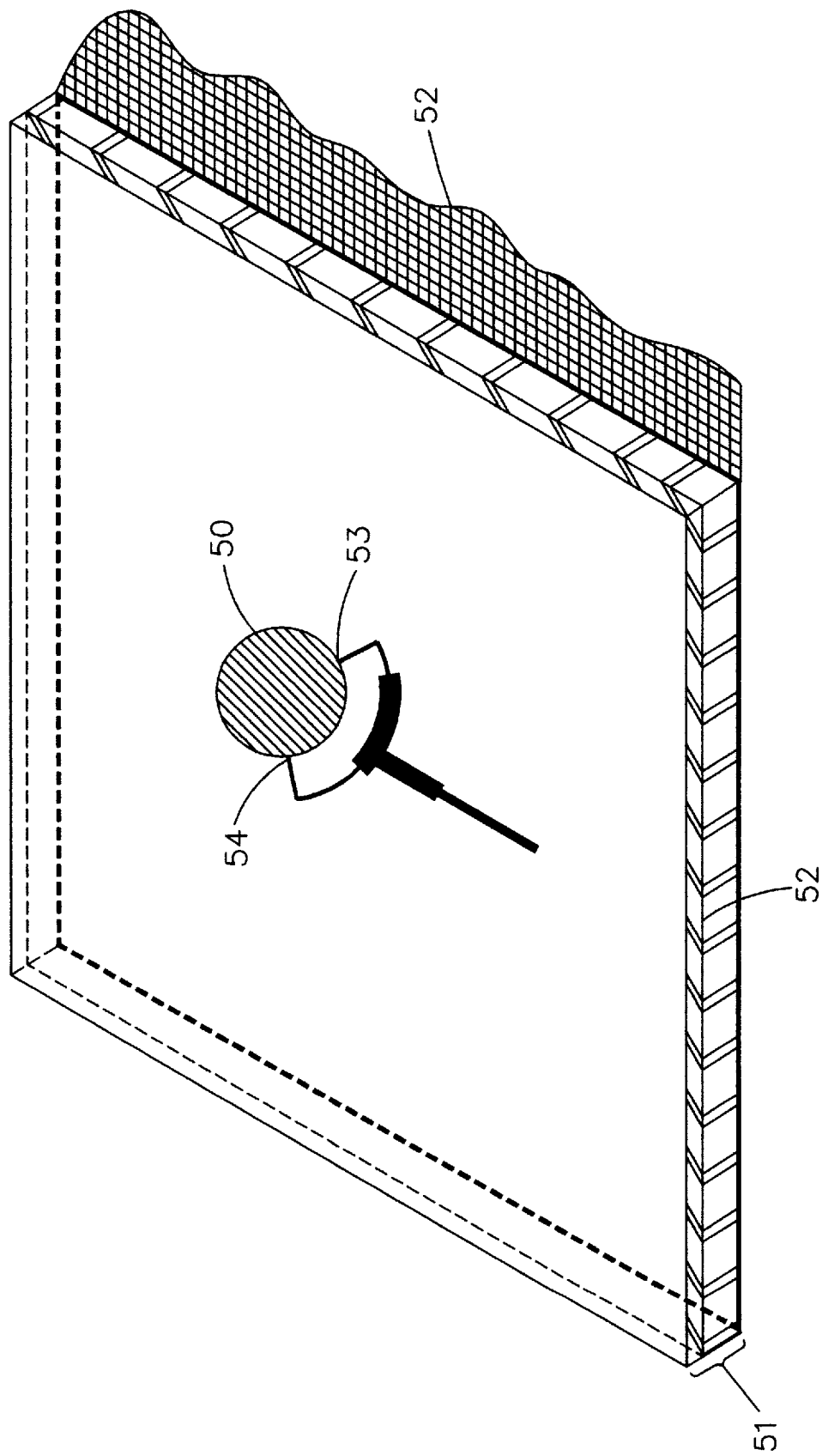
FIG. 5 shows a microstrip line fed dual feed microstrip patch element of circular configuration bonded on a dielectric substrate backed by a conducting screen which serves as the electrical ground for the antenna.

It is further to be appreciated that if the frequency band of the communication system is in the lower microwave frequencies (900 MHz through 6 GHz, for example) then the material of the KEVLAR helmet structure will be used as part of the antenna substrate. In that case, the conducting ground layer of the microstrip antenna system has to be buried inside the KEVLAR helmet at a suitable depth from the top surface. Such conducting ground might be in the form of an aluminum mesh 52 of suitable mesh size as shown in FIGS. 5 and 6 and incorporated in the helmet structure during the helmet manufacturing process. For the wire mesh 52, the mesh dimension "d" which is the length of one side of a mesh opening, is approximately 0.01 times the wavelength of the antenna operational frequency in the media in which the mesh is embedded.

It is to be understood that the mesh openings could be other than square, but irrespective of configuration, the mesh openings are limited by the requirement that the mesh must be able to attenuate the electromagnetic field of the antenna transmission through it by at least 60 dB (−60 dB or better). The mesh in addition to serving as a radio frequency shield for the person's head has additional advantages of being light in weight and is less likely to fracture during construction. The additional thin substrate of the THERMOUNT material on which the microstrip antenna structure is printed will not then have the conducting layer on its underside.

The feed structure of the antenna is very important and is designed to be compatible with the helmet manufacturing process such that distortions produced on the structure while conforming to the non planar surface of the helmet are minimized. The antenna structure is first printed on the conducting surface of a very thin (0.003 inch to 0.005 inch) THERMOUNT sheet as the dielectric sheet 16 shown in FIG. 2 or 16b as in FIG. 4. The dielectric sheet is then cut appropriately as along the radially directed dashed lines 44 which are selected so as not to sever any of the microstrip feed lines or radiator elements of the antenna. When further cut along the arcuate lines 46 connecting alternate pairs of the radial lines 44, segments 47a of the sheet 16b are thereby removed thus providing the sheet 16b with flaps 47b. The sheet 16b with flaps 47b is then bonded to the helmet top surface as described or included in the helmet construction in a process as suggested by U.S. Pat. No. 4,778,638. With particular reference to FIG. 2, which illustrates a preferred embodiment of the invention, it is shown that the helmet antenna consists of N+1 antenna elements 14 with one element 14 being at the top center of the helmet and the other N elements 14 being arranged in a ring, which in general may be a staggered arrangement around the helmet where the individual antenna elements are located on the helmet surface at different predetermined distances from the top element and at predetermined locations estimated by computer modelling and analysis such that an optimum omnidirectional radiation pattern is achieved. The antenna elements of the ring are fed by radially directed feed lines coming out of a power divider feed network which is also located on the top surface of the helmet.

One important point of consideration in the design of the integrated microstrip antenna system in a helmet is that the antenna system should not add significant additional weight to the helmet.

For integrated microstrip antennas operating at lower microwave frequencies (such as in the range of 900 MHZ through 6 GHz), upper layers of the helmet may be used as the dielectric substrate material of the antenna system and a thin metallic sheet (like copper) itself may be bonded on the top surface of the helmet during the helmet manufacturing process. The integrated microstrip antenna pattern is then chemically etched from that metallic layer. During the helmet manufacturing process the electrically conducting ground layer, in the form of a thin metallic sheet or screen (like copper) is buried inside the helmet at a predetermined depth below the top surface.

A feed structure for an antenna array, where N=4 as shown in FIGS. 1 and 2 is built on the planar conducting surface of the thin (about 0.003" to 0.005" thick) THERMOUNT sheet, with the bottom side having no such conducting layer. A thin metallic sheet (such as copper) or screen serving as the ground surface of the antenna is buried at a certain depth inside the helmet during the manufacturing process. In FIG. 1 the feed structure begins at a feed point 30 near the base of the helmet 12 where it is connectable to a power signal source by means of an appropriate connection such as by a coaxial connector. The feed structure includes a branch 31 which runs upwards towards the center top where it divides at a point 32 into two branches with a predetermined power ratio, with one branch 33 further dividing at point 34 into two additional branches 35,36 in predetermined power ratios with the first branch 35 feeding the dual fed circularly polarized center element N1 and the second branch 36 going to a point 37 and extending radially therefrom to couple to and feed the dual fed circular polarized element N2. The other branch 38 of the said first power divider goes to a point 39 where it further divides into two branches 40 and 41 with predetermined power ratios, with one branch 40 going to a point 42 from where the feed line extends radially therefrom to feed the dual fed circular polarized element N3. The other branch 41 extends along the helmet surface to a point 43 from where it runs radially downwards to connect to and feed the dual fed circular polarized element N4.

It is to be understood that the length of each feed line segment, including the radially outward directed parts, is predetermined so as to optimize the omnidirectional shape of the radiation pattern of the helmet antenna within the acceptable tolerance limit for the antenna. Also, while the feed structure for the array is shown to be in the same layer as the antenna elements with a conductive feed coupling, it could, alternatively, to meet some antenna requirements lie in a lower dielectric surface layer with electromagnetic feed point coupling as shown in FIGS. 6 and 7 and which also provides advantages of reducing gain pattern distortion by spurious radiations from the microstrip feed lines. The feed structure could also lie on a lower dielectric surface layer separated by a thin conducting layer with electromagnetic feed point coupling through apertures. Furthermore, the antenna radiator elements could be quadruple fed to provide for higher axial ratio bandwidth as shown in the antenna element 90 in FIG. 9. A stacked patch element technique where multiple near identical microstrip antenna elements separated by one or multiple layers of dielectric substrates could also be employed to improve the impedance bandwidth as shown in FIG. 6 and hereinafter described.

In FIG. 5, there is illustrated a single circular microstrip patch antenna element 50 with coplanar dual feed to excite the desired sense of circular polarization which, in the illustration, is right circular polarization. The printed antenna is on a thin dielectric substrate 51 which is to be bonded to the KEVLAR helmet in which lies buried a thin conducting mesh 52 acting as the conducting ground surface. In this embodiment, the helmet material acts as the second layer of the substrate. The two microstrip line feed points 53, 54 are arranged in space quadrature relation and are so connected by the microstrip feed network as to provide equi-amplitude signals in phase quadrature relation and thereby create the desired sense of circular polarization.

In FIG. 6, there is shown a circular microstrip patch antenna element 60 which is electromagnetically coupled to a feed element 61 of near identical size disposed directly below it and separated therefrom by a dielectric layer 62.

In FIG. 7 is described a four element circular microstrip antenna array, the radiating antenna elements 70 of which on a surface 71 are electromagnetically coupled to the corresponding feed elements 70a located directly below on a dielectric layer 72. The feed elements 70a are provided with their own microstrip feed network 75, also located on the layer 72, and substantially identical to the feed network 20 of FIG. 2. The electromagnetically coupled antenna system 70 has a higher bandwidth of operation and the dielectric substrate 73 separating the two layers 71,72 protects the feed lines from external damage.

Figure 8:
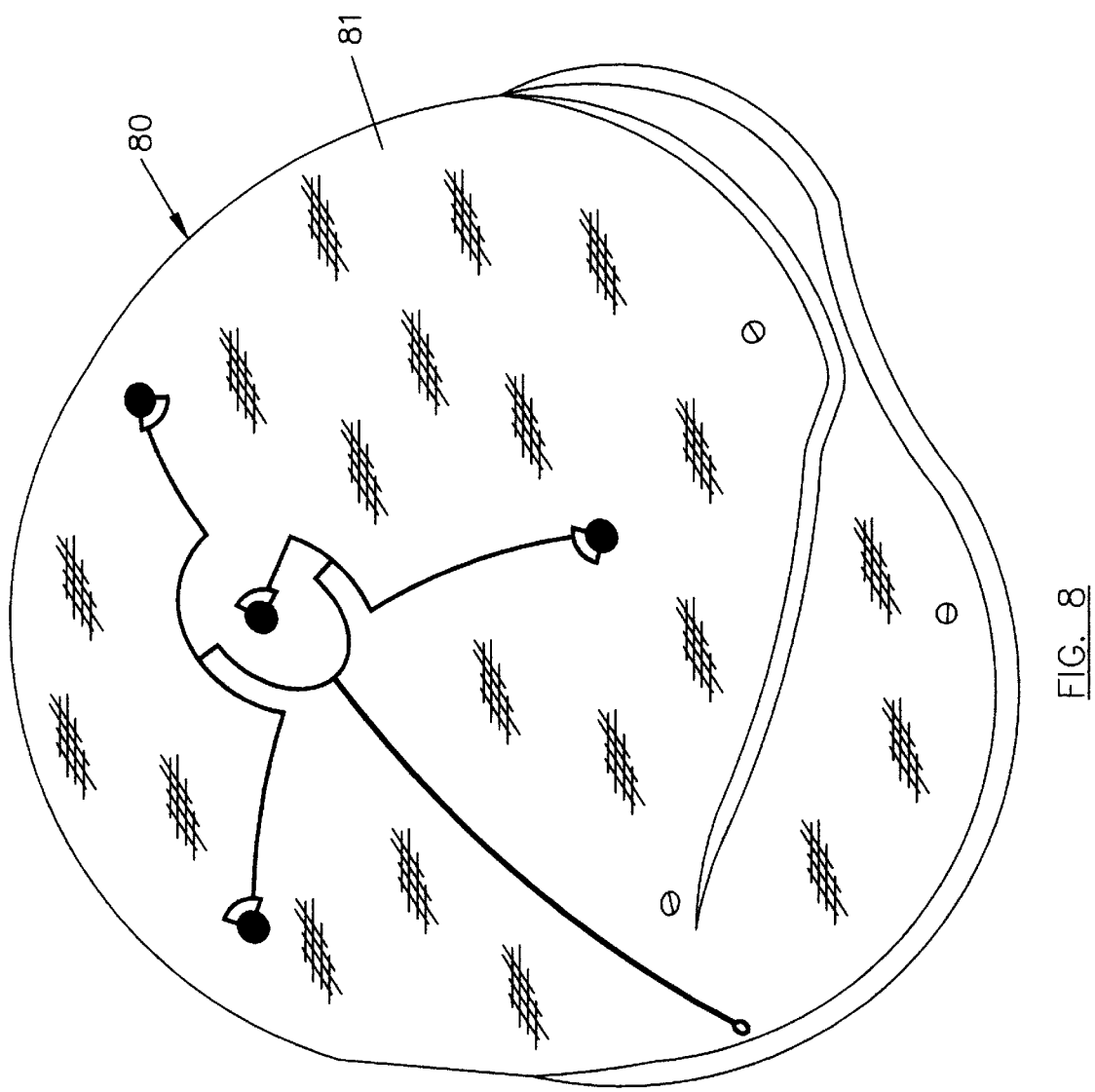
FIG. 8 shows an integrated antenna layout for a four element antenna array as shown in FIG. 1 wherein the helmet and microstrip antenna system are provided with a radome skin cover in another modification of the invention.

In FIG. 8 is shown an integrated helmet antenna system 80, similar to the system of FIG. 1, but with a radome 81 in the form of a skin bonded to and covering the top surface of the antenna structure and the microstrip feed network 82. The radome skin is a thin layer of dielectric material, such as a woven KEVLAR fabric, and is typically of a thickness less than $0.01\lambda$ where $\lambda$ is the operating center wavelength of the antenna. The antenna structure is thereby hidden and protected by the radome, while allowing unencumbered transmission and reception.

It is also to be understood that the single band antenna structure of the invention may serve as the receiving antenna for the Global Positioning System (GPS) which uses an operating center frequency of 1575.5 MHz. In such an application, a single dual fed circularly polarized circular microstrip patch element as described earlier or a single quadruple fed circularly polarized circular microstrip patch element 90 (FIG. 9) which is to be later located at the top of the helmet and fed at points c, d, e and f by a pair of T-junction power dividers at points 91, 92 of a microstrip feed network 93 may suffice for GPS signal reception. An array of such elements 90 may provide a better quality antenna in terms of gain profile, axial ratio bandwidth and impedance matching.

It is to be understood therefore that the foregoing description of the invention has been presented for purposes of explanation and illustration and is not intended to limit the invention to the precise forms disclosed. For example, the microstrip antenna radiator elements could have a square configuration rather than circular and a wide variety of materials could be used for the various layers and the helmet itself. Accordingly, it is to be appreciated that changes may be made in the precise structure of the helmet and antenna system by those skilled in the art without departing from the spirit of the invention.

I claim:

1. An integrated helmet and microstrip antenna system which is adapted to provide substantially omnidirectional transmission and reception of microwave and millimeter wave signals as well as reception of Global Positioning System Signals, said integrated helmet antenna system comprising:

a helmet structure comprising a sheet of dielectric material as the top layer thereof;

a first circularly polarized microstrip antenna radiator element bonded on the top side of said dielectric sheet, said sheet having an electrically conducting ground layer bonded on one side to the bottom of said sheet to form a layer of said helmet structure and serve as an electrical ground for the antenna system;

an array of three more antenna radiating elements bonded to the top side of said dielectric sheet and arranged on the helmet in a ring array around said first antenna element, said antenna elements each adapted to be excited and circularly polarized by a dual feed microstrip feed line structure with appropriate pre-determined amplitude and relative phase distributions among said antenna radiator elements so as to produce a wide angle antenna radiation pattern acceptable for a specific antenna performance requirement, said feed structure comprising a microstrip feed line originating from a feed point near the base of the helmet where it is connectable to a coaxial connector for coupling to a power signal source and signal collection point, said feed line running upwards to the top center region of the helmet where it divides into a pair of branches in predetermined power ratios, the first branch of said first pair further dividing into a second pair of branches in predetermined power ratios with one branch of said second pair feeding said first circularly polarized element at the center top of the helmet, and the other branch of said second pair being routed around said top antenna element at a distance to avoid undesired coupling and extending radially outward from the top of the helmet to feed one of the other three antenna elements at a predetermined location, the second branch of said first pair further dividing into another pair of branches in predetermined power ratio, with each branch of said other pair being routed about the said element at the top center of the helmet with sufficient separation amongst the feed lines so as to minimize feed line coupling, said two branches of said other pair spreading radially outward from the top of the helmet with each connecting to a different one of the remaining two antenna elements which are in predetermined coupling locations on the helmet.

2. The omnidirectional helmet antenna system as set forth in claim 1 wherein each microstrip antenna radiator element and the microstrip feed line structure is printed on said dielectric sheet.

3. The omnidirectional helmet antenna system as set forth in claim 2 wherein the integrated printed antenna structure is covered by a thin layer of dielectric material which serves as a radome for the antenna system.

4. The omnidirectional helmet antenna system as set forth in claim 1 wherein the dielectric substrate on which the antenna elements are mounted are made of unwoven aramid materials.

5. The omnidirectional helmet antenna system in claim 1 wherein the helmet is made of woven aramid material.

6. The omnidirectional helmet antenna system as set forth in claim 1 wherein the circularly polarized microstrip antenna elements are circular microstrip patches.

7. The omnidirectional helmet antenna system as set forth in claim 1 wherein each circularly polarized radiator element is fed by microstrip line matched T-junction type power dividers.

8. The omnidirectional helmet antenna system as set forth in claim 1 wherein each circularly polarized antenna radiator element is a microstrip line quadruple fed element.

9. The integrated helmet and microstrip antenna system as set forth in claim 1 wherein said electrically conducting ground layer is in the form of a wire screen.

10. The integrated helmet and microstrip antenna system as set forth in claim 9 wherein the size of a conducting wire screen opening of the wire mesh is defined by a side of the opening having a dimension approximately of the order of 0.01 times the wavelength of the antenna operating frequency in the media in which the mesh is embedded.

11. An integrated helmet and microstrip antenna system which is adapted to provide substantially omnidirectional transmission and reception of microwave and millimeter wave signals as well as reception of Global Positioning System Signals, said integrated helmet antenna system comprising:

a helmet structure comprising a sheet of dielectric material as the top layer thereof;

at least one microstrip antenna radiator element bonded on the top side of said dielectric sheet;

an electrically conducting ground layer bonded on one side to the bottom of said sheet to form a layer of said helmet structure and serve as an electrical ground for the antenna system;

a microstrip feeder network comprising a microstrip feed line originating from a feed point near the base of the helmet where it is adapted to be connected to a coaxial connector for coupling to a power signal source and signal collection point, said feed line running upwards from said feed point to a point near said antenna radiator element where it divides to provide a junction power divider, said power divider being coupled to said antenna radiator element at dual feed points located on mutually orthogonal input axes of the radiator element coupled thereto for providing a 90° phase shift in the signal to one of said dual feed points with respect to the other so as to generate circular polarization of the desired sense.

12. The integrated helmet and integrated microstrip antenna system as set forth in claim 11 wherein the helmet is made of woven aramid material.

13. The integrated helmet and integrated microstrip antenna system as set forth in claim 11 wherein said sheet of dielectric material is made of unwoven aramid material.

14. The integrated helmet and integrated microstrip antenna system as set forth in claim 11 wherein said electrically conducting ground layer is in the form of a wire mesh having mesh openings wherein the side of a mesh opening is approximately of the order of 0.01 times the operating frequency of the antenna in the media in which said mesh is embedded.

15. An integrated helmet and microstrip antenna system which is adapted to provide substantially omnidirectional transmission and reception of microwave and millimeter wave signals as well as reception of Global Positioning System Signals, said integrated helmet antenna system comprising:

a helmet structure comprising a sheet of dielectric material as the top layer thereof, an electrically conducting ground layer bonded on one side to the bottom of said sheet to form a layer of said helmet structure and serve as an electrical ground for the antenna system;

a first circularly polarized microstrip antenna radiator element bonded on the top side of said dielectric sheet near the top center of the helmet structure;

a plurality of additional antenna radiating elements bonded to the top side of said dielectric sheet and arranged on the helmet in a ring array around said first antenna element, said antenna elements each adapted to be excited and circularly polarized by a dual feed microstrip feed line structure with appropriate predetermined amplitude and relative phase distributions among said antenna radiator elements so as to produce a wide angle antenna radiation pattern acceptable for a specific antenna performance requirement, said feed structure comprising a microstrip feed line originating from a feed point near the base of the helmet where it is connectable to a power signal source and signal collection point, and a plurality of T-junction power dividers wherein each of said power dividers is coupled to a different one of said antenna radiator elements at feed points located on mutually orthogonal input axes of the radiator element coupled thereto so as to provide inputs with a 90° phase shift of one of said inputs with respect to the other whereby said antenna system will generate circular polarization radiation of the desired sense.

16. An integrated helmet and microstrip antenna system as set forth in claim 15 wherein said helmet structure and said sheet of dielectric material are of aramid material.

17. An integrated helmet and microstrip antenna system as set forth in claim 15 wherein said helmet structure is of woven aramid material and said dielectric sheet is of non-woven aramid material.

18. An integrated helmet and microstrip antenna system as set forth in claim 15 wherein said electrically conducting ground layer is a wire mesh having square mesh openings with side dimensions approximately of the order of 0.01 times the operating frequency of the antenna in the media in which the mesh is embedded.

19. An integrated helmet and microstrip antenna system adapted to provide omnidirectional wide angle transmission and reception of microwave and millimeter wave signals as well as reception of Global Positioning System Signals, said integrated helmet antenna system comprising:

a helmet structure comprising a sheet of dielectric material as the top layer thereof;

an electrically conducting ground wire screen bonded on one side to the bottom of said sheet to form a layer of said helmet structure and serve as an electrical ground for the antenna system;

a first circularly polarized microstrip antenna radiator element bonded on the top side of said dielectric sheet near the top center of the helmet structure; and a plurality of additional antenna radiating elements bonded to the top side of said dielectric sheet and arranged on the helmet in a ring array around said first antenna element, said antenna elements each adapted to be excited and circularly polarized by a dual feed microstrip feed line structure with appropriate predetermined amplitude and relative phase distributions among said antenna radiator elements so as to produce a wide angle antenna radiation pattern acceptable for a specific antenna performance requirement, said feed structure comprising a microstrip feed line originating from a feed point near the base of the helmet where it is connectable to a power signal source and signal collection point and further including a plurality of T-junction power dividers wherein each of said power dividers is coupled to a different one of said antenna radiator elements at feed points located on mutually orthogonal input axes of the radiator element coupled thereto so as to provide inputs with a 90° phase shift of one of said inputs with respect to the other whereby said antenna system will generate circular polarization radiation of a desired sense.

20. An integrated helmet and microstrip antenna system as set forth in claim 19 wherein said helmet structure and said sheet of dielectric material are of aramid material.

21. An integrated helmet and microstrip antenna system as set forth in claim 19 wherein the conducting screen openings are of a size and configuration so as to attenuate the electromagnetic field of the antenna transmission by at least 60 dB.

* * * * *